United States Patent
Leone et al.

(10) Patent No.: US 9,341,129 B2
(45) Date of Patent: May 17, 2016

(54) VISCOSITY DETECTION USING STARTER MOTOR

(71) Applicant: Ford Global Technologies, LLC, Dearborn, MI (US)

(72) Inventors: Thomas G. Leone, Ypsilanti, MI (US); Alexander O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 14/054,706

(22) Filed: Oct. 15, 2013

(65) Prior Publication Data

US 2015/0105996 A1    Apr. 16, 2015

(51) Int. Cl.
| | | |
|---|---|---|
| *F01M 5/02* | (2006.01) | |
| *F02D 41/04* | (2006.01) | |
| *F02D 41/24* | (2006.01) | |
| *F01M 11/10* | (2006.01) | |
| *F02D 41/06* | (2006.01) | |
| *F02N 11/00* | (2006.01) | |

(52) U.S. Cl.
CPC .............. *F02D 41/04* (2013.01); *F01M 11/10* (2013.01); *F02D 41/2451* (2013.01); *F02D 41/062* (2013.01); *F02D 2200/023* (2013.01); *F02D 2200/101* (2013.01); *F02N 11/00* (2013.01); *F02N 2200/022* (2013.01); *F02N 2200/041* (2013.01); *F16N 2250/36* (2013.01)

(58) Field of Classification Search
CPC . F02D 41/06; F02D 41/062; F02D 2200/023; F01M 11/1473; F01M 2011/148
USPC ............... 123/179.3, 179.13, 179.15, 339.24, 123/491; 290/40 A; 184/6.22; 701/113
See application file for complete search history.

(56) References Cited

U.S. PATENT DOCUMENTS

| | | | |
|---|---|---|---|
| 5,056,622 A | 10/1991 | Vermeulen | |
| 5,752,488 A * | 5/1998 | Hattori | F02D 41/061 123/179.16 |
| 6,196,174 B1 | 3/2001 | Wada et al. | |
| 6,216,528 B1 | 4/2001 | Carrell et al. | |
| 6,374,783 B1 * | 4/2002 | Toriumi | F01L 9/04 123/90.11 |
| 6,575,018 B2 | 6/2003 | Berndorfer et al. | |
| 6,634,329 B2 * | 10/2003 | Kusano et al. | F01L 1/34 123/90.17 |
| 6,901,788 B2 | 6/2005 | Han et al. | |
| 8,079,335 B2 | 12/2011 | Rollinger et al. | |
| 8,113,186 B2 * | 2/2012 | Tsunooka et al. | F02D 41/14 123/698 |
| 8,342,013 B2 | 1/2013 | Nedachi et al. | |
| 8,857,403 B2 * | 10/2014 | Quix et al. | F01M 5/00 123/196 AB |

(Continued)

OTHER PUBLICATIONS

Leone, Thomas G., "Viscosity Detection Using SUMP," U.S. Appl. No. 14/054,701, Filed Oct. 15, 2013, 61 pages.

*Primary Examiner* — Hai Huynh
(74) *Attorney, Agent, or Firm* — Julia Voutyras; Alleman Hall McCoy Russell & Tuttle LLP

(57) ABSTRACT

Various methods for inferring oil viscosity and/or oil viscosity index in an internal combustion engine are provided. In one example, a new control method comprises cranking the engine during a start mode with an electric motor connected to a substantially constant source of electrical power, inferring engine oil viscosity based at least on engine oil temperature and speed of the engine while being cranked by the electric motor during the start mode, and correcting an operating parameter of the engine based on the inferred engine oil viscosity.

20 Claims, 11 Drawing Sheets

(56) References Cited

U.S. PATENT DOCUMENTS

| | | |
|---|---|---|
| 2004/0047391 A1 | 3/2004 | Berndorfer et al. |
| 2004/0123587 A1* | 7/2004 | Kamiya .............. F02D 41/0235 60/284 |
| 2005/0039521 A1 | 2/2005 | Han et al. |
| 2009/0217740 A1 | 9/2009 | Nedachi et al. |
| 2010/0236227 A1 | 9/2010 | Yoshioka |
| 2013/0291835 A1* | 11/2013 | Imamura ................ F02D 13/02 123/445 |
| 2015/0105995 A1* | 4/2015 | Leone ................ F02D 41/2451 701/103 |

\* cited by examiner

VISCOSITY DETECTION USING STARTER MOTOR

FIELD

The field of the disclosure relates to engine control with changing oil viscosities and detection thereof.

BACKGROUND AND SUMMARY

Oil viscosity has a direct effect on engine friction which in turn affects engine torque output and idle speed. Therefore engine friction should be estimated or assumed by many parts of the engine control strategy including idle speed control and electronic throttle control. Oil viscosity also affects oil pressure, which in turn affects systems like VCT (variable camshaft timing) which rely on oil pressure to operate.

For traditional engine oils, viscosity changes dramatically as a function of temperature (i.e., a low viscosity index). New oils are being developed that have much higher viscosity index, so their viscosity changes much less with temperature.

Some engine control strategies include temperature modifiers which help compensate for changes in oil viscosity. For example, at low temperature, and higher viscosity, a greater throttle opening (higher airflow) is used to achieve a desired idle speed or engine output torque.

The inventors herein have recognized that these temperature modifiers may cause undesired operation if the engine is refilled with oil having a viscosity index which is significantly different than the manufacturer's recommendation. For example, temperature modifiers designed for manufacturer recommended high viscosity index oil will not change idle throttle openings much at low temperature. If the engine is refilled with low viscosity index oil, the idle speed at low temperatures will be lower than intended, and the engine may stall.

The inventors have solved these issues by a new control strategy which detects actual oil viscosity and/or viscosity index and controls the engine appropriately. In one aspect, a new control method comprises: cranking the engine during a start mode with an electric motor connected to a substantially constant source of electrical power; inferring engine oil viscosity based at least on engine oil temperature and speed of the engine while being cranked by the electric motor during the start mode; and correcting an operating parameter of the engine based on the inferred engine oil viscosity. In a more specific example, the operating parameter of the engine comprises a throttle position of a throttle plate controlling an amount of air inducted into the engine. And, the throttle plate is commanded to a throttle position based on a desired engine idle speed, oil temperature and an assumed viscosity of the oil, and the throttle position or angle is corrected for the inferred oil viscosity. In this manner, the correct idle speed will be maintained even after a significant change in viscosity after an engine oil change. Thus, the technical result is achieved by these actions.

In another aspect of the disclosure, the inventors have provided a method which learns oil viscosity index and controls the engine appropriately. In particular, the method comprises: cranking the engine during a start mode with an electric motor connected to a substantially constant source of electrical power; inferring engine oil viscosity based at least on engine oil temperature and speed of the engine while being cranked by the electric motor during the start mode; after at least two of the inferences, learning viscosity index of the engine oil from the inferred engine oil viscosities and the temperatures; and correcting an engine operating parameter based on current temperature of the engine oil and the learned viscosity index of the engine oil.

In still another aspect of the disclosure the inventors have provided a method which is particularly applicable to hybrid vehicles. In particular, the method comprises: accelerating the engine during a start mode with an electric motor until the engine reaches a predetermined speed; inferring engine oil viscosity based at least on engine oil temperature and an amount of electrical power used for the engine to reach the predetermined speed during the start mode; and correcting an operating parameter of the engine based on the inferred oil viscosity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Engine torque output and idle speed are directly affected by the viscosity of oil flowing through the engine. Accordingly, engine operation may be operated in a more optimal manner if oil viscosity is known. Some types of engine oils have viscosities which vary significantly as a function of temperature. In some approaches, engine operation is modified to compensate these changes in viscosity. For example, the position of a throttle plate controlling the air inducted into an engine may be varied as changes in oil viscosity occur. However, such approaches may not be adapted to significant changes in viscosity index, due, for example, to engine oil changes. As such, suboptimal engine operation may occur, resulting in stalls, for example.

Figure 1:
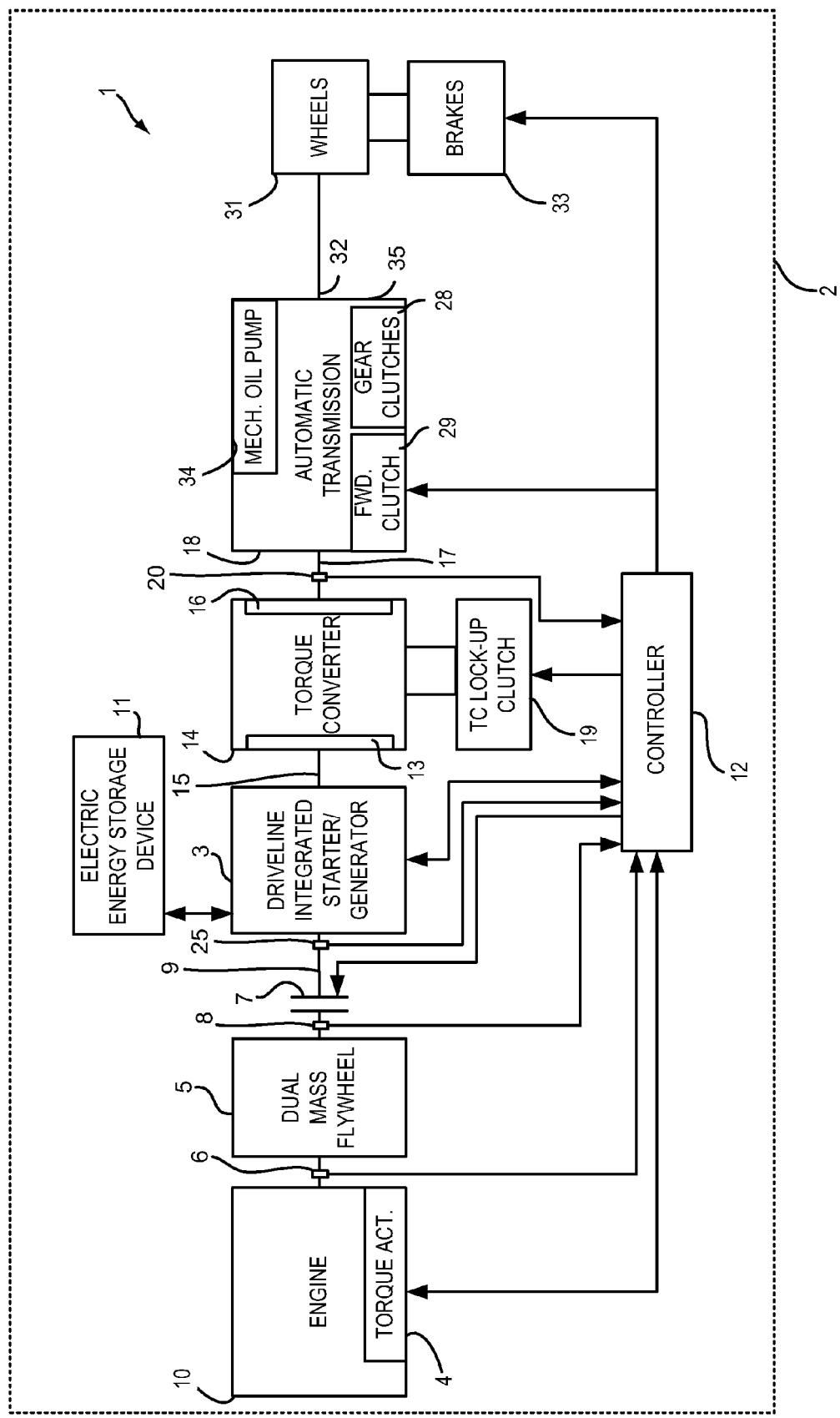
FIG. 1 illustrates an example vehicle driveline.
Figure 2:
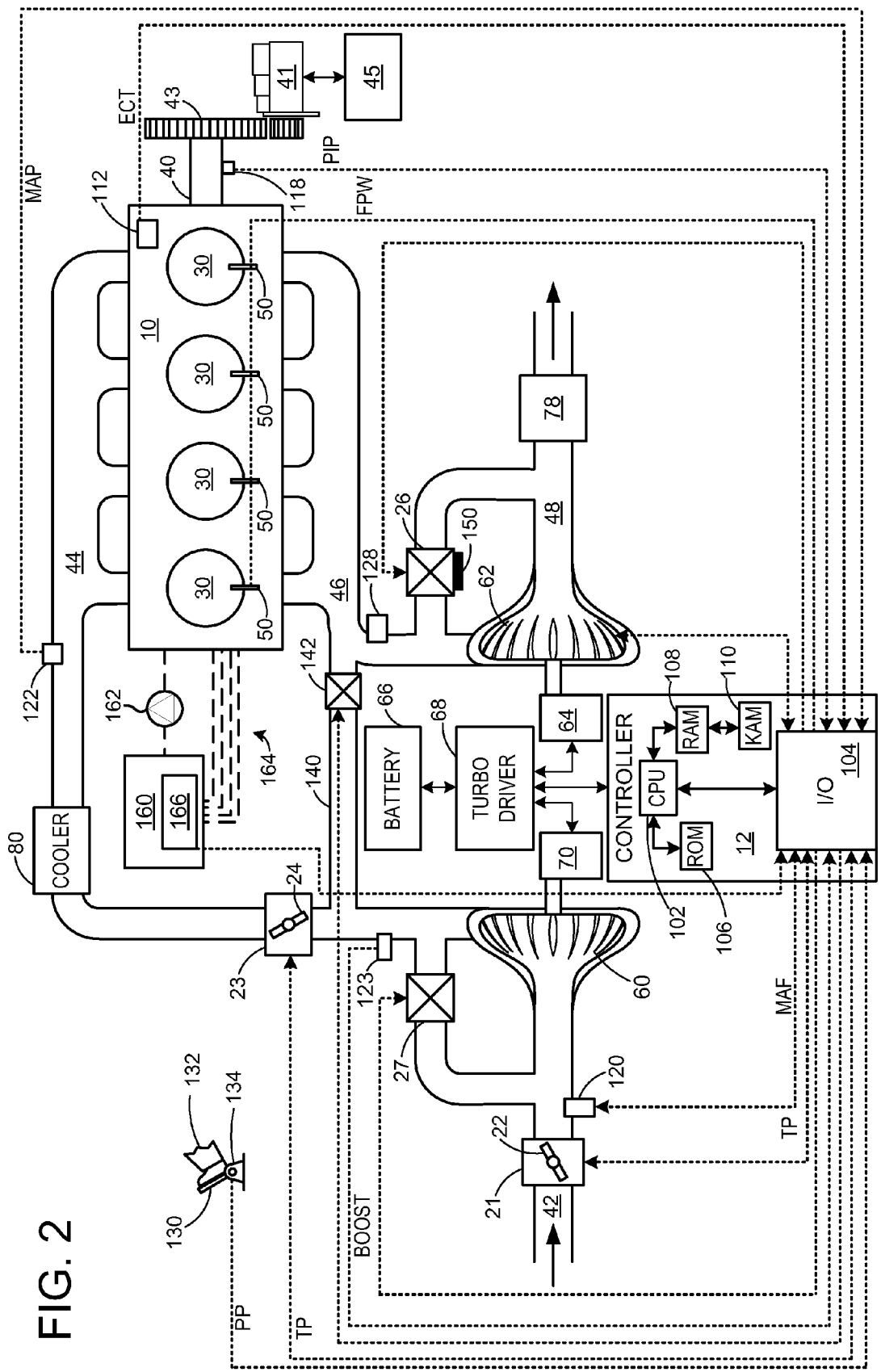
FIG. 2 shows a block diagram of a turbocharged engine.
Figure 3:
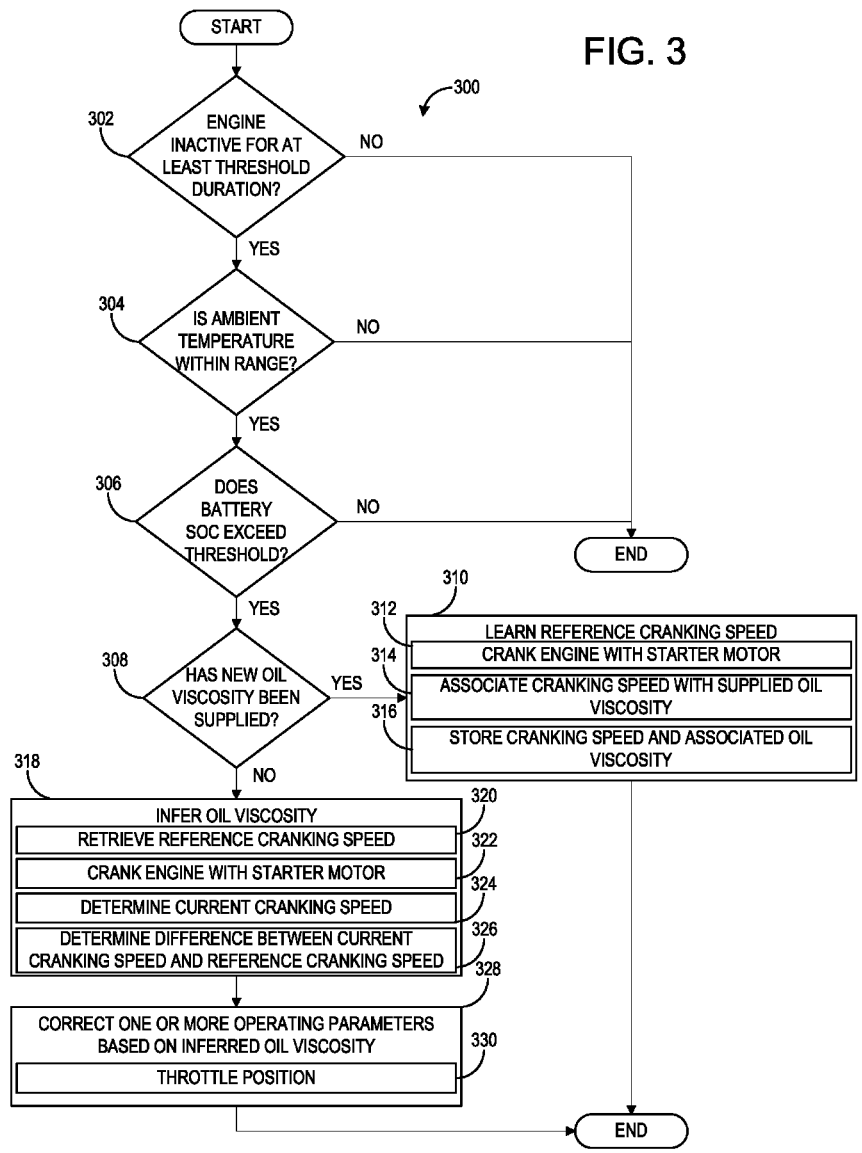
FIG. 3 shows a flowchart illustrating a method for inferring the viscosity of oil in the engine of FIG. 2.
Figure 4:
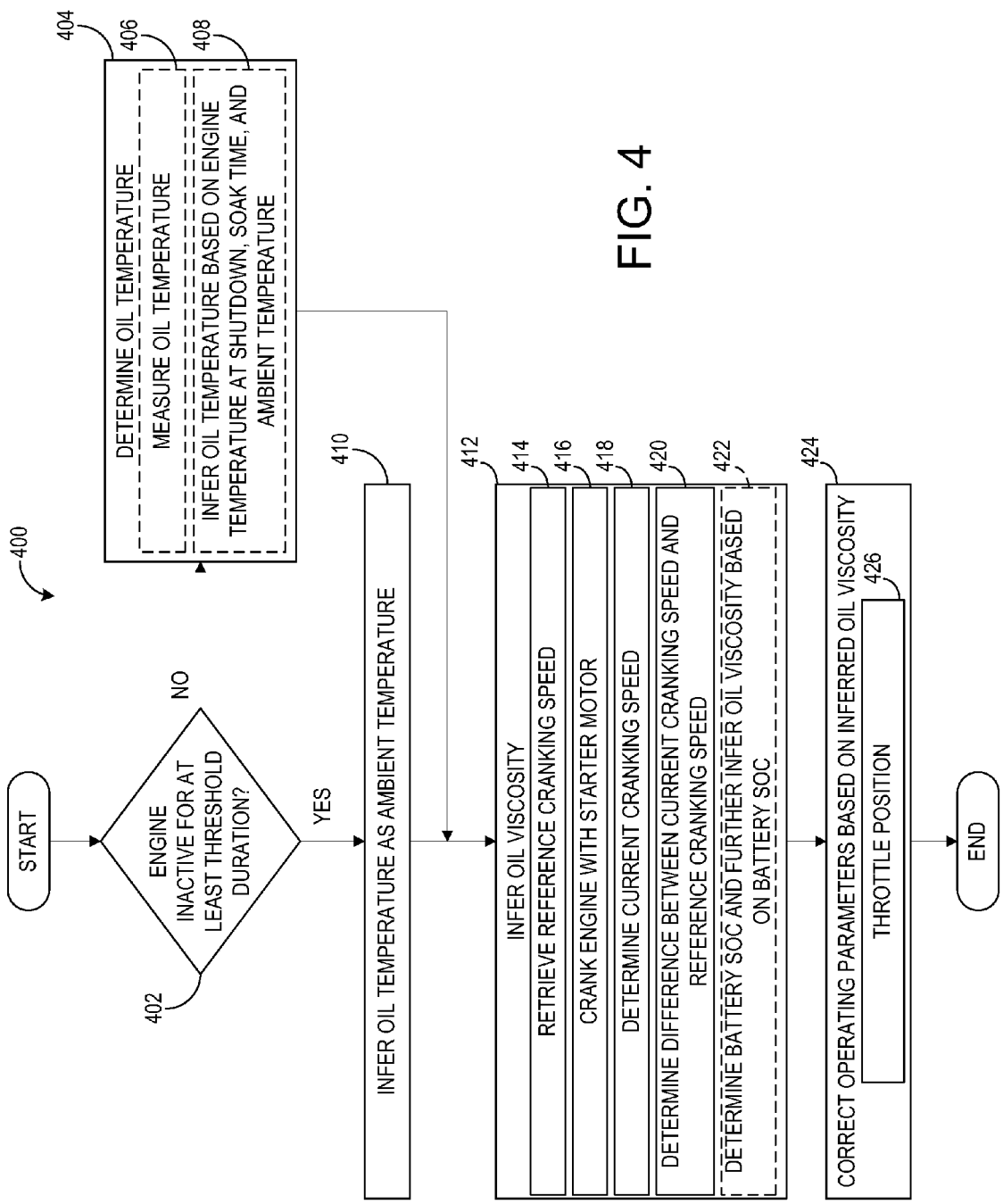
FIG. 4 shows a flowchart illustrating another method for inferring the viscosity of oil in the engine of FIG. 2.
Figure 5:
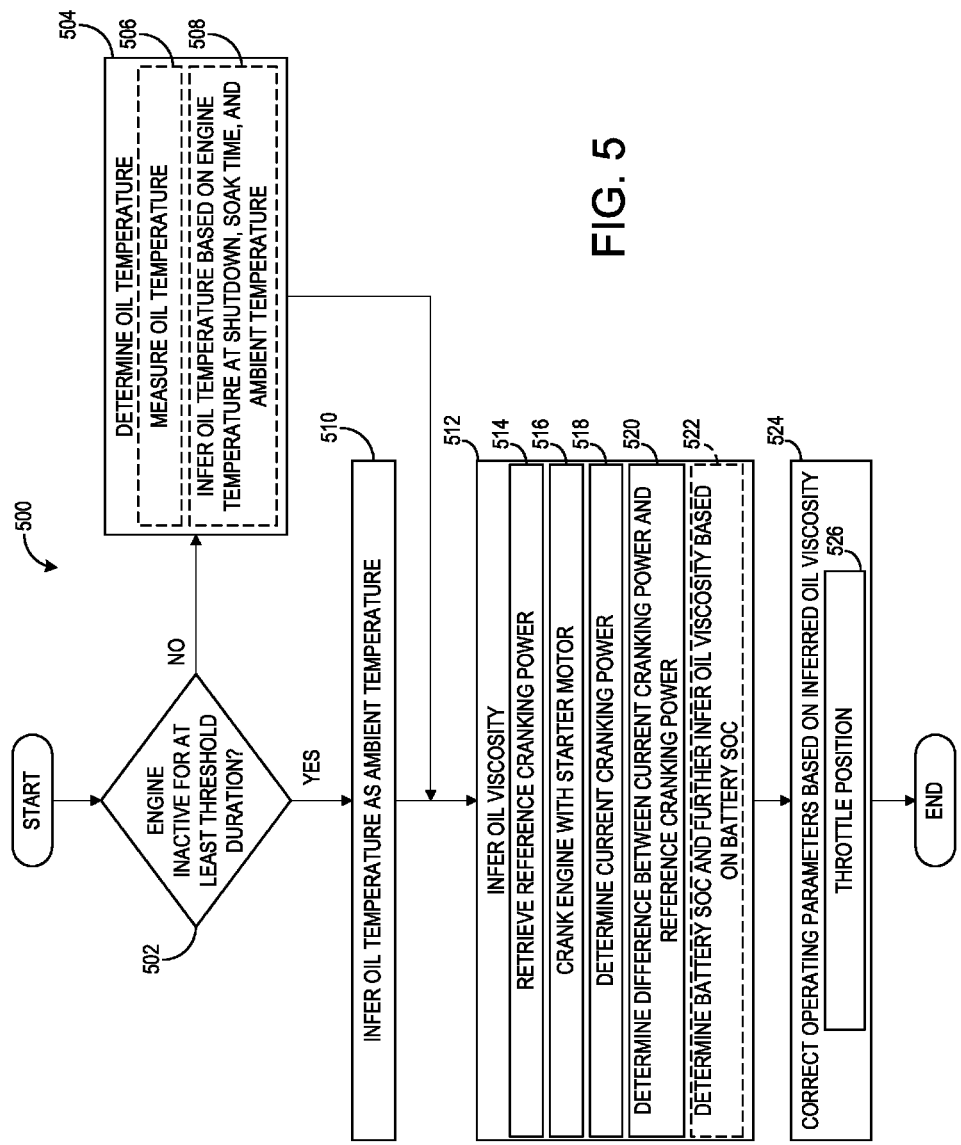
FIG. 5 shows a flowchart illustrating a method for inferring the viscosity of oil in the vehicle driveline of FIG. 1.
Figure 6:
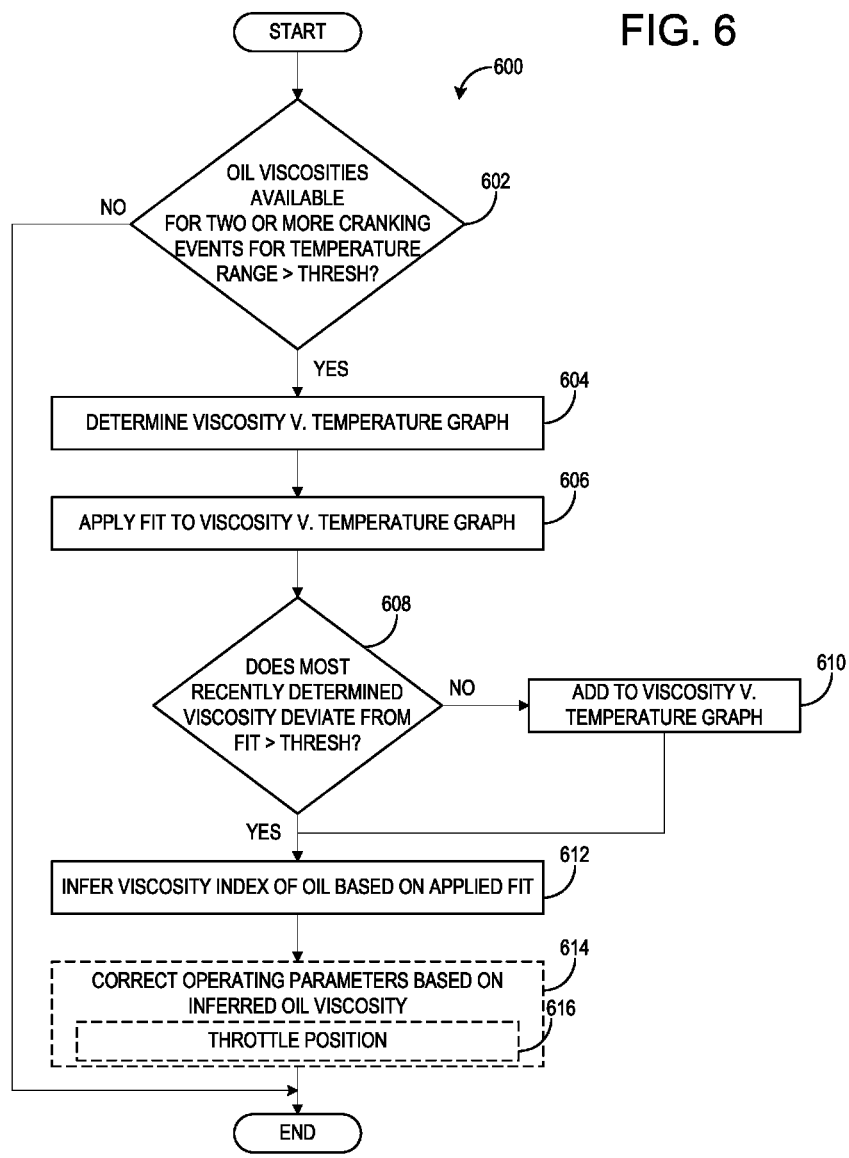
FIG. 6 shows a flowchart illustrating a method for inferring the viscosity index of oil in the engine of FIG. 2.
Figure 7:
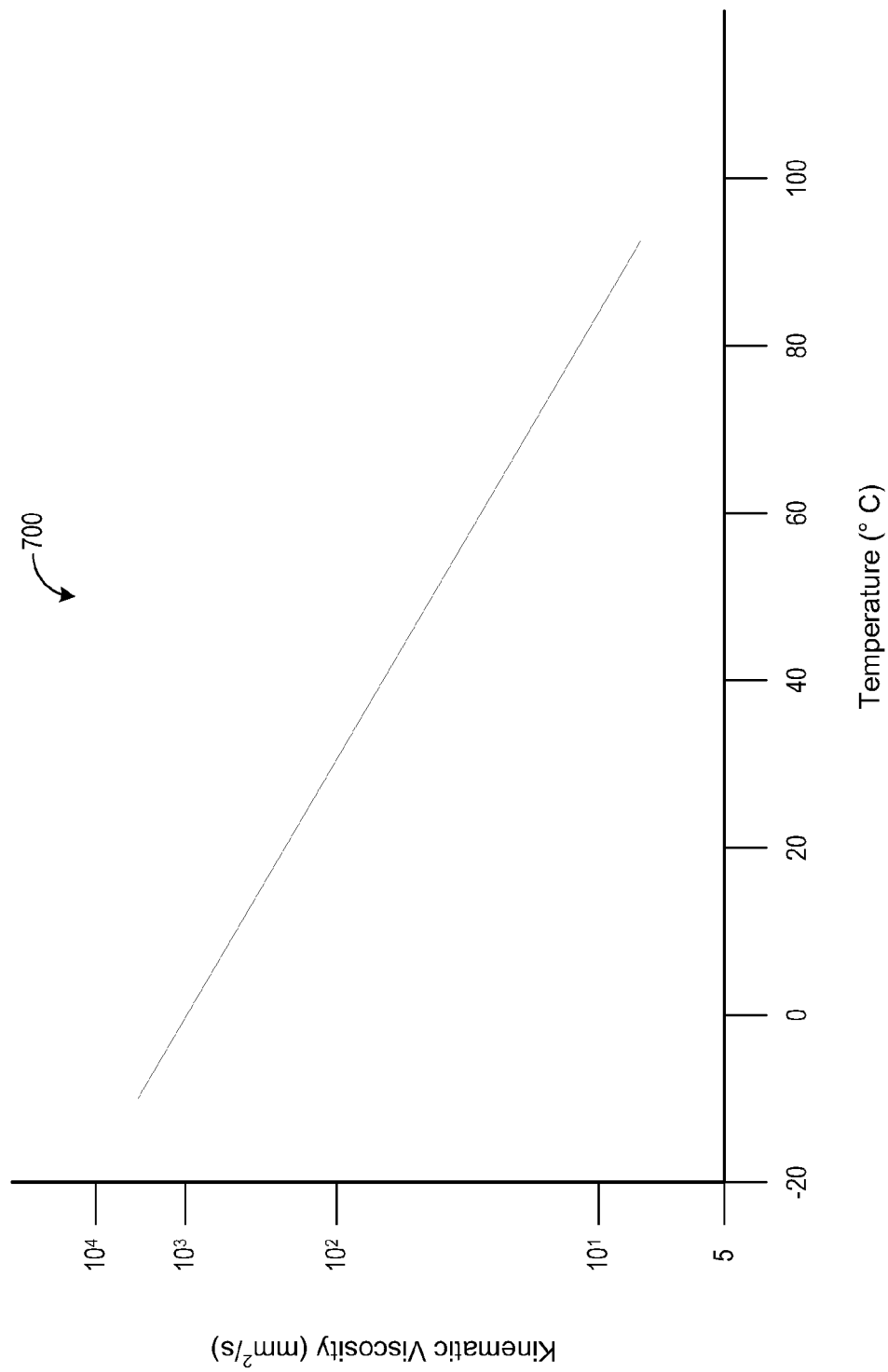
FIG. 7 shows an exemplary oil viscosity-temperature graph formed in accordance with an embodiment of the present disclosure.
Figure 8:
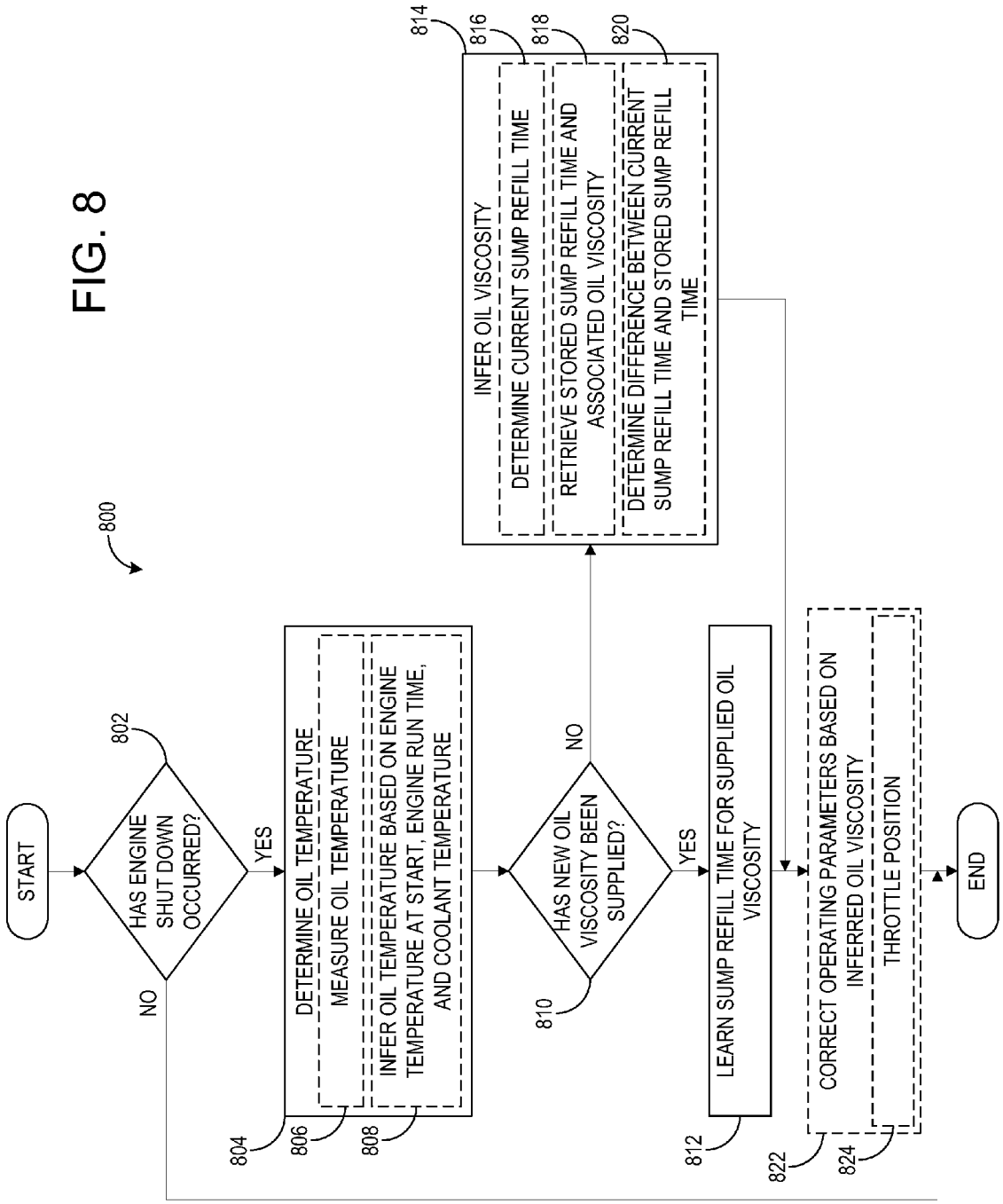
FIG. 8 shows a flowchart illustrating a method for inferring the viscosity of oil in the engine of FIG. 2 based on sump refill time.
Figure 9:
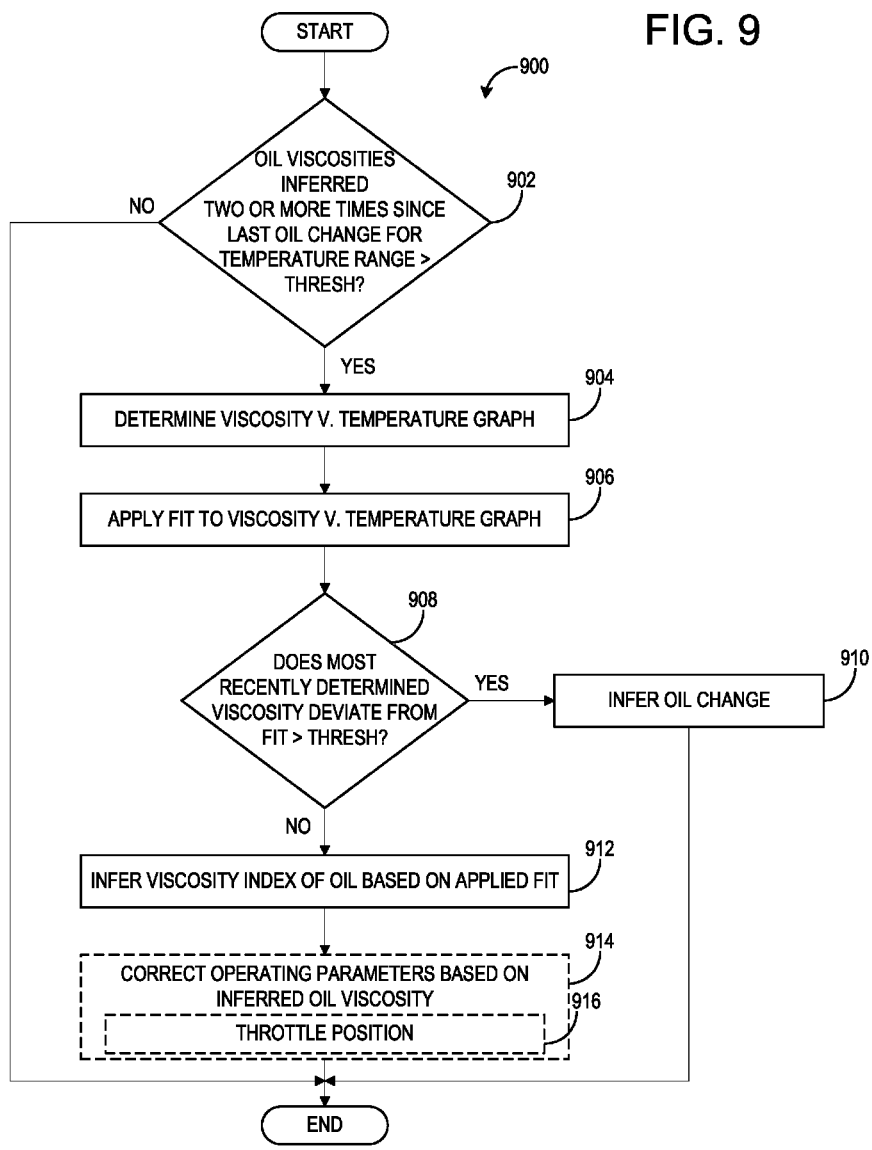
FIG. 9 shows a flowchart illustrating a method for inferring the viscosity index of oil in the engine of FIG. 2 based on sump refill time.
Figure 10:
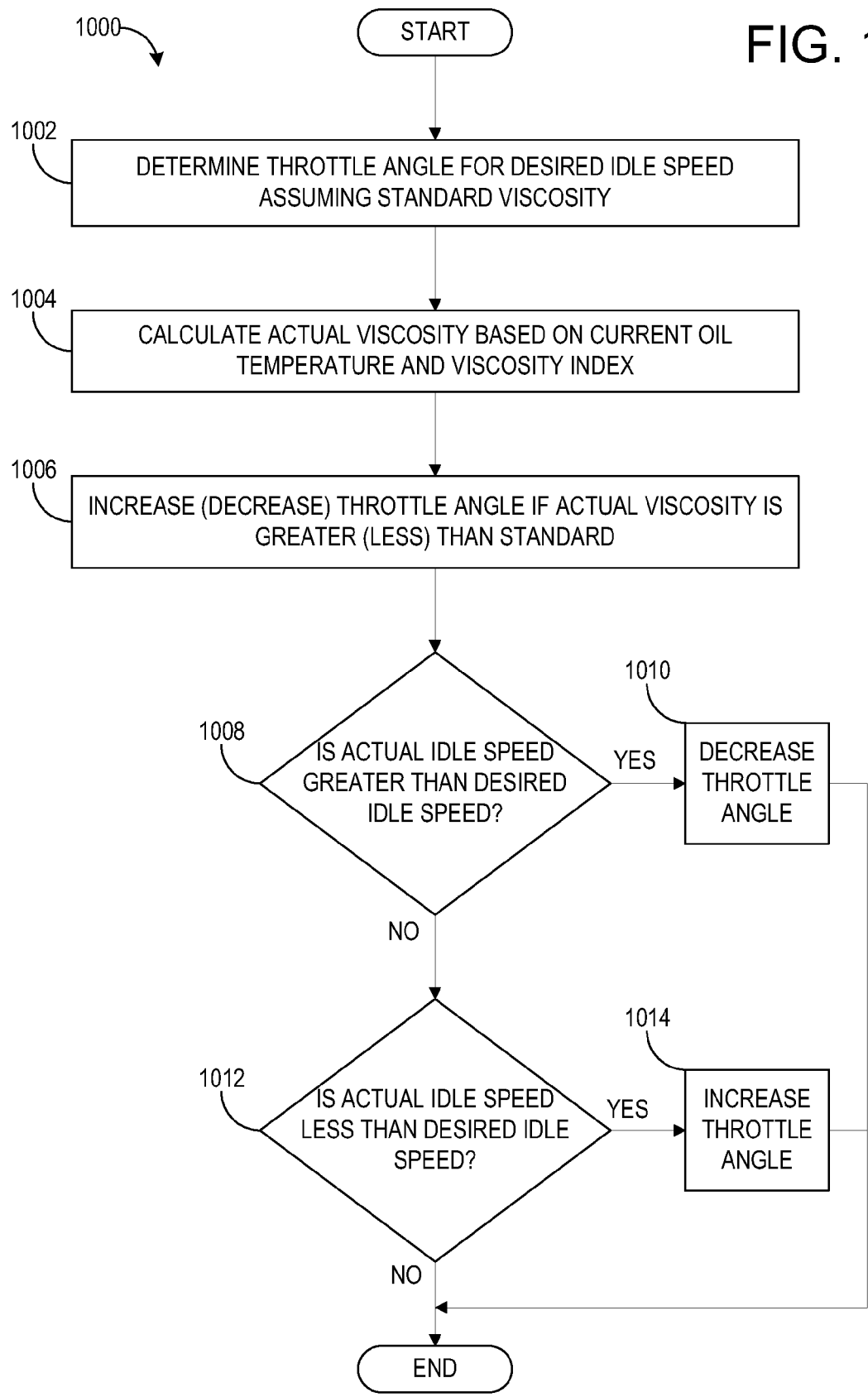
FIG. 10 shows a flowchart illustrating a method for controlling the idle speed of the engine of FIG. 2.
Figure 11:
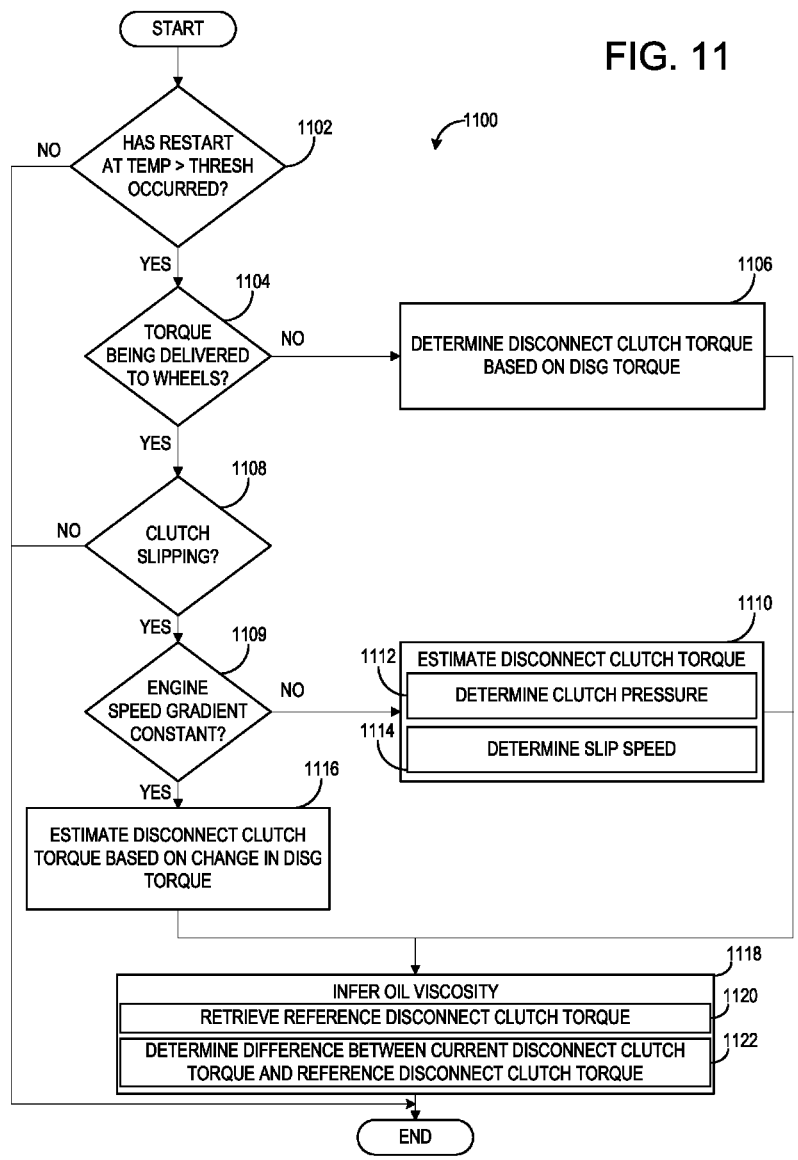
FIG. 11 shows a flowchart illustrating a method for inferring the viscosity of oil in an MHT hybrid vehicle.

Various methods for inferring oil viscosity and/or oil viscosity index in an internal combustion engine are provided. In one example, a new control method comprises cranking the engine during a start mode with an electric motor connected to a substantially constant source of electrical power, inferring engine oil viscosity based at least on engine oil temperature and speed of the engine while being cranked by the electric motor during the start mode, and correcting an operating parameter of the engine based on the inferred engine oil viscosity. FIG. 1 illustrates an example vehicle driveline. FIG. 2 shows a block diagram of a turbocharged engine. FIG. 3 shows a flowchart illustrating a method for inferring the viscosity of oil in the engine of FIG. 2. FIG. 4 shows a flowchart illustrating another method for inferring the viscosity of oil in the engine of FIG. 2. FIG. 5 shows a flowchart illustrating a method for inferring the viscosity of oil in the vehicle driveline of FIG. 1. FIG. 6 shows a flowchart illustrating a method for inferring the viscosity index of oil in the engine of FIG. 2. FIG. 7 shows an exemplary oil viscosity-temperature graph formed in accordance with an embodiment of the present disclosure. FIG. 8 shows a flowchart illustrating a method for inferring the viscosity of oil in the engine of FIG. 2 based on sump refill time. FIG. 9 shows a flowchart illustrating a method for inferring the viscosity index of oil in the engine of FIG. 2 based on sump refill time. FIG. 10 shows a flowchart illustrating a method for controlling the idle speed of the engine of FIG. 2. FIG. 11 shows a flowchart illustrating a method for inferring the viscosity of oil in an MHT hybrid vehicle. The engine of FIG. 2 also includes a controller configured to carry out the methods depicted in FIGS. 3-6 and 8-10.

FIG. 1 is a block diagram of a vehicle driveline 1 and vehicle 2. Driveline 1 may be powered by engine 10. Engine 10 may be started with DISG 3, a Driveline Integrated Starter Generator which in this particular example is a type of hybrid vehicle. Further, engine 10 may generate or adjust torque via torque actuator 4, such as one or more of a fuel injector, throttle, camshaft, valve lift, etc.

An engine output torque may be transmitted to an input side of dual mass flywheel 5. Engine speed as well as dual mass flywheel input side position and speed may be determined via an engine position sensor 118 described in further detail below with reference to FIG. 2. Dual mass flywheel 5 may include springs and separate masses (not shown) for dampening driveline torque disturbances. The output side of dual mass flywheel 5 is shown being mechanically coupled to the input side of disconnect clutch 7. Disconnect clutch 7 may be electrically or hydraulically actuated, and may be used to crank engine 10 during hot restarts, and in some embodiments, during warm restarts as well. A position sensor 8 is positioned on the disconnect clutch side of dual mass flywheel 5 to sense the output position and speed of the dual mass flywheel 5. The downstream side of disconnect clutch 7 is shown mechanically coupled to DISG input shaft 9.

DISG 3 may be operated to provide torque to driveline 1 or to convert driveline torque into electrical energy to be stored in electric energy storage device 11. DISG 3 may have a higher output torque capacity than motor 41 shown in FIG. 2. Further, DISG 3 directly drives driveline 1 or is directly driven by driveline 1. There are no belts, gears, or chains to couple DISG 3 to driveline 1. Rather, DISG 3 rotates at the same rate as driveline 1. Electrical energy storage device 11 may be a battery, capacitor, or inductor. The downstream side of DISG 3 is mechanically coupled to the impeller 13 of torque converter 14 via shaft 15. The upstream side of the DISG 3 is mechanically coupled to the disconnect clutch 7. Torque converter 14 includes a turbine 16 to output torque to transmission input shaft 17. Transmission input shaft 17 mechanically couples torque converter 14 to automatic transmission 18. Torque converter 14 also includes a torque converter bypass lock-up clutch 19 (TCC). Torque is directly transferred from impeller 13 to turbine 16 when TCC is locked. TCC is electrically operated by controller 12. Alternatively, TCC may be hydraulically locked. In one example, the torque converter may be referred to as a component of the transmission. Torque converter turbine speed and position may be determined via position sensor 20. In some examples, 25 and/or 20 may be torque sensors or may be combination position and torque sensors.

When torque converter lock-up clutch 19 is fully disengaged, torque converter 14 transmits engine torque to automatic transmission 18 via fluid transfer between the torque converter turbine 16 and torque converter impeller 13, thereby enabling torque multiplication. In contrast, when torque converter lock-up clutch 19 is fully engaged, the engine output torque is directly transferred via the torque converter clutch to input shaft 17 of transmission 18. Alternatively, the torque converter lock-up clutch 19 may be partially engaged, thereby enabling the amount of torque directly relayed to the transmission to be adjusted. The controller 12 may be configured to adjust the amount of torque transmitted by torque converter 19 by adjusting the torque converter lock-up clutch in response to various engine operating conditions, or based on a driver-based engine operation request.

Automatic transmission 18 includes gear clutches (e.g., gears 1-N where N is an integer number between 2-25) 28 and forward clutch 29. The gear clutches 28 and the forward clutch 29 may be selectively engaged to propel a vehicle. Torque output from the automatic transmission 18 may in turn be relayed to wheels 31 to propel the vehicle via output shaft 32. Specifically, automatic transmission 18 may transfer an input driving torque at the input shaft 17 responsive to a vehicle traveling condition before transmitting an output driving torque to the wheels 31.

Further, a frictional force may be applied to wheels 31 by engaging wheel brakes 33. In one example, wheel brakes 33 may be engaged in response to the driver pressing his foot on a brake pedal (not shown). In other examples, controller 12 or a controller linked to controller 12 may engage wheel brakes 33. In the same way, a frictional force may be reduced to wheels 31 by disengaging wheel brakes 33 in response to the driver releasing his foot from a brake pedal. Further, vehicle brakes may apply a frictional force to wheels 31 via controller 12 as part of an automated stopping procedure.

A mechanical oil pump 34 may be in fluid communication with automatic transmission 18 to provide hydraulic pressure to engage various clutches, such as forward clutch 29, gear clutches 28, and/or torque converter lock-up clutch 19. Mechanical oil pump 34 may be operated in accordance with torque converter 14, and may be driven by the rotation of the engine or DISG via input shaft 15, for example. Thus, the hydraulic pressure generated in mechanical oil pump 34 may increase as an engine speed and/or DISG speed increases, and may decrease as an engine speed and/or DISG speed decreases.

Controller 12 may be configured to receive inputs from engine 10, as shown in more detail in FIG. 2, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 18 to a case 35 of the transmission and thereby to the frame of the vehicle. In particular, the controller 12 may engage one or more transmission clutches, such as forward clutch 29, and lock the engaged transmission clutch (es) to the transmission case 35 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 33 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

FIG. 2 is a schematic diagram showing an exemplary embodiment of engine 10, which may be included in a propulsion system of an automobile including but not limited to vehicle driveline 1 shown in FIG. 1. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, an electric (e.g., starter) motor 41 is shown as being coupled to crankshaft 40 via a flywheel 43 to enable a starting operation of engine 10. Electrical power may be provided to electric motor 41 via a vehicle battery 45. Vehicle battery 45 may enable cranking of engine 10 as well as other operations including spark-ignition and vehicle lighting, and may be of various suitable types including but not limited to a 12 volt lead-acid battery. Vehicle battery 45 may provide a substantially (e.g., less than 5% variation) constant source of electrical power to motor 41 and other components, depending on its state of charge (SOC).

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. An exemplary method for controlling throttle position is described below with reference to FIG. 10. The position of throttle plates 22 and 24 may be provided to controller 12 by throttle position signal TP. Intake passage 42 may further include a mass air flow sensor 120, a manifold air pressure sensor 122, and a throttle inlet pressure sensor 124 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric or a pneumatic actuator. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 2 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 2 also schematically illustrates the flow of oil through engine 10 for reducing wear of engine components and facilitating dissipation of heat arising from friction. In this example, oil is pumped from an oil sump 160 by an oil pump 162 to lubricate a plurality of moving parts in engine 10 such as crankshaft 40 and its connecting rods, as well as bearings in the connecting rods and pins of pistons positioned in cylinders 30. Oil may also be used for lubrication between the rings of the pistons and cylinders 30. The thickness and friction of this oil film are dependent on the oil temperature and properties such as oil viscosity. After reaching the moving parts of engine 10, the oil drains back to sump 160 via a plurality of drain lines 164. Oil may circulate throughout the engine via a plurality of channels (not shown).

Oil sump 160 includes an oil level sensor 166 configured to output indications of the oil level in the oil sump to controller 12. Output from oil level sensor 166 may be tracked over time and used to monitor the rate at which oil drains from engine 10 to oil sump 160 following engine shut down. Oil drain rates obtained in this way may used to assess the viscosity of oil in engine 10 as described in further detail below.

Turning now to FIG. 3, a flowchart illustrating an exemplary method 300 for inferring oil viscosity in an internal combustion engine is shown. Method 300 may be stored as machine-readable instructions in ROM 106 of controller 12 in FIG. 2, for example. Although method 300 is described with reference to engine 10 of FIG. 2, it will be understood that method 300 may be carried out for other internal combustion engines.

At 302 of method 300, it is determined whether the engine has been inactive for at least a threshold duration. The engine may be considered to be inactive throughout a duration in which it is not operating—e.g., not combusting fuel or rotating. Rotation of the engine may be evaluated by monitoring a PIP signal produced by a Hall effect sensor (e.g., sensor 118 in FIG. 2), for example. The threshold duration may be selected to correspond to a duration after which the temperature of the engine substantially decreases (e.g., to within 10° C. of ambient temperature) following shut off from a preceding cycle. Thus, identifying changes in the speed at which the engine is cranked following the threshold duration may allow the disambiguation of multiple effects which may cause such changes. Changes in cranking speed due specifically to changes in oil viscosity may be particularly identified. If it is determined that the engine has not remained inactive for at least the threshold duration (NO), the method ends. If it is determined that the engine has remained inactive for at least the threshold duration (YES), the method proceeds to 304.

At 304 of the method, it is determined whether the ambient temperature is within a predetermined range of temperatures. As with the threshold duration described above, changes in engine cranking speed due specifically to changes in oil viscosity may be identified by ensuring that excessively hot or cool ambient temperatures do not significantly affect oil viscosity. The predetermined range of temperatures may extend, for example, from 20° C. to 25° C. Ambient temperature may be measured directly by an ambient temperature sensor, disposed for example proximate to a front region of the vehicle, or indirectly by inferring the ambient temperature based on measurements from one or more other temperature sensors (e.g., sensor 112 in FIG. 2). If it is determined that the ambient temperature is not within the predetermined range of temperatures (NO), the method ends. If it is determined that the ambient temperature is within the predetermined range of temperatures (YES), the method proceeds to 306.

At 306 of the method, it is determined whether the state of charge (SOC) of the battery (e.g., battery 45 of FIG. 2) exceeds a SOC threshold. As with the threshold duration and range of ambient temperatures described above, changes in engine cranking speed due specifically to changes in oil viscosity may be identified by ensuring that low battery charges do not significantly affect cranking speed. The current SOC may be inferred based on battery voltage, temperature, history of current flowing to and from the battery, etc. The SOC threshold may be selected based on the particular battery used and set to a state of charge threshold below which cranking speed is significantly affected. As a non-limiting example, the SOC threshold may be 70% of maximum charge (e.g., 100%). If it is determined that the SOC of the battery does not exceed the SOC threshold (NO), the method ends. If it is determined that the SOC of the battery does exceed the SOC threshold (YES), the method proceeds to 308.

At 308, it is determined whether information about a new oil viscosity has been supplied to a control system of the engine, for example by a vehicle operator or service technician. A new oil viscosity may be supplied to an engine controller executing method 300 such as controller 12 of FIG. 2, and stored in a storage medium of the engine controller (e.g., ROM 106). In some scenarios, a new oil viscosity may be supplied in a manufacturing environment prior to, or concurrent with, an initial activation (e.g., firing) of the engine. The engine may be filled with oil. In other scenarios, a new oil viscosity may be supplied upon an oil change. Replacement (or new) oils may have a manufacturer recommended viscosity suited for the engine, or may have other known viscosities. New oil viscosities may be supplied to an engine control unit in various suitable manners—for example, through a service tool connected to an on-board diagnostics (OBD) port, via an in-vehicle touchscreen or other driver information display, or via a specified sequence or combination of key on/off events and/or switches. New viscosities may be supplied to the engine control unit over a controller area network (CAN), and in some embodiments, via a wireless communication link. For example, oil cans or tags having a machine-readable code (e.g., 1D or 2D bar code) indicating the viscosity of oil held therein may be interpreted and sent to the engine controller over the wireless communication link. If a new oil viscosity has been supplied (YES), the method proceeds to 310. If a new oil viscosity has not been supplied (NO), the method proceeds to 318.

At 310 of the method, a reference cranking speed is learned which defines the speed at which the engine is cranked during a start mode. In this start mode, variables such as engine activity, ambient temperature, and battery SOC are within acceptable limits and do not adversely affect or otherwise skew the cranking speed. In the illustrated embodiment, the reference cranking speed is learned by cranking the engine with the starter motor (e.g., motor 41 of FIG. 2) at 312 and associating the resulting cranking speed with the supplied oil viscosity at 314. As described above, cranking speed may be determined via PIP signals provided by a Hall effect or other type of sensor (e.g., sensor 118 of FIG. 2). In some embodiments, the cranking speed in this start mode may not be associated with the supplied oil viscosity until a threshold duration in which the engine is cranked is exceeded. Additionally or alternatively, cranking speed may not be associated with the supplied oil viscosity until the cranking acceleration falls below a threshold acceleration. Such approaches may mitigate inaccurate determinations of reference cranking speed due to transient changes in cranking speed. In some examples (e.g., in an assembly or maintenance environment), learning a reference cranking speed may occur when the engine is filled with an oil having a manufacturer recommended oil viscosity or other known viscosity. In this example, the engine may be new.

Next, at 316, the learned reference cranking speed and the associated oil viscosity are stored in a suitable storage medium. Learned cranking speeds and associated viscosities may be stored in ROM 106 of controller 12 in FIG. 2, for example, and may stored via various suitable data structures such as a look-up table configured to output an oil viscosity for a given cranking speed. It will be appreciated that, in some embodiments, however, a new oil viscosity substantially similar (e.g., within 5%) to its preceding oil viscosity may not prompt learning of the reference cranking speed. Following 316, the method ends.

At 318 of the method, if a new oil viscosity has not been supplied, the oil viscosity is inferred. Inferring the oil viscosity includes, at 320, retrieving the reference cranking speed previously learned or otherwise supplied. Retrieval of the reference cranking speed may include accessing a suitable data structure (e.g., look-up table) in which the reference cranking speed is stored, and may include retrieval of the oil viscosity associated with the reference cranking speed. It will be appreciated that a plurality of reference cranking speeds and associated oil viscosities may be stored in such a data structure. Various criteria may be used to select a particular reference cranking speed. Next, at 322, the engine is cranked with the starter motor. At 324, the current cranking speed during this period of engine cranking is determined via the methods described above (e.g., by measuring PIP signals generated by sensor 118 in FIG. 2). Then, at 326, the difference between the current cranking speed and the learned or supplied reference cranking speed is determined. This difference may then be used to infer oil viscosity—for example, if the current cranking speed is significantly less than the reference cranking speed, it may be concluded that oil viscosity has increased relative to the preceding viscosity. Such changes in oil viscosity may be quantified by not only comparing the difference between the current and reference cranking speeds but also the oil viscosity associated with the reference cranking speed. In one approach, the difference between the current and reference cranking speeds may be multiplied by the oil viscosity associated with the reference cranking speed to determine the new oil viscosity, for example.

Next, at 328 of the method, one or more operating parameters are corrected based on the oil viscosity inferred at 318. Among other adjustments, such correction may include adjusting, at 330, the throttle position of a throttle plate controlling an amount of air inducted into the engine—e.g., throttle plate 22 of throttle 21 in FIG. 2. For example, the throttle position of the throttle plate may be increased to further open the throttle upon determining that oil viscosity has increased. Ascertaining oil viscosity may allow the engine to maintain the correct idle speed even after a significant change in viscosity following an oil change, as well as supply correct torque output and valve timings. Subsequent throttle adjustments may then place the throttle plate to a commanded position based on various parameters including, but not limited to, desired engine idle speed, oil temperature, and inferred oil viscosity.

Corrections to one or more operating parameters based on oil viscosities inferred via method 300 may result in increased fuel economy, increased drivability, and reduced frequency of stalls. The accuracy of inferring oil viscosities via cranking speeds may also be increased as a plurality of factors which may affect cranking speed can be disambiguated.

It will be appreciated that method 300 may be adjusted in various ways. For example, an additional decision box may determine whether a change in cranking speed above a first threshold but below a second threshold has been detected. Changes in cranking speed below the first threshold may be considered insignificant and ignored or averaged out, while large changes may be used to indicate that an oil change has occurred. The oil viscosity may then be inferred via the methods described above. Alternatively or additionally, an alert may be sent to the vehicle operator (e.g., via dashboard indicators or a display) indicating detection of an oil change and optionally requesting information about the new oil.

Turning now to FIG. 4, a flowchart illustrating an exemplary method 400 for inferring oil viscosity is shown. Method 400 may be stored as machine-readable instructions in ROM 106 of controller 12 in FIG. 2, for example. Although method 400 is described with reference to engine 10 of FIG. 2, it will be understood that method 400 may be carried out for other internal combustion engines.

At 402 of method 400, it is determined whether the engine has been inactive for at least a threshold duration. As described above, rotation of the engine and thus its activity may be evaluated by monitoring a PIP signal produced by a Hall effect or other type of sensor (e.g., sensor 118 in FIG. 2). The threshold duration may facilitate the disambiguation of a plurality of factors which affect cranking speed during engine start, and thus identification of changes in cranking speed due to changes in oil viscosity. If it is determined that the engine has not remained inactive for at least the threshold duration (NO), the method proceeds to 404. If it is determined that the engine has remained inactive for at least the threshold duration (YES), the method proceeds to 410.

At 404 of the method, oil temperature is determined. Here, variations in oil viscosity caused by high or low oil temperatures are accounted for. Determination of the oil temperature may include directly measuring the oil temperature at 406 should output from a sensor configured to measure oil temperature be available. Such a sensor may be disposed along the plurality of drain lines 164 or in sump 160 in FIG. 2, for example. Conversely, the oil temperature may be inferred at 408 based on a plurality of parameters including the temperature of the engine at the immediately preceding shutdown, the soak time of the engine since shutdown, and the current ambient temperature, which may be determined as described above. Oil temperature may be further inferred from one or more temperatures measured elsewhere in the engine, such as the temperature of cylinder head metal.

At 410 of the method, if the engine has been remained inactive for at least the threshold duration, the oil temperature is inferred as being the ambient temperature.

Next, at 412 of the method, oil viscosity is inferred. Inferring the oil viscosity includes retrieving a reference cranking speed at 414. As described above, one or more reference cranking speeds may be stored in a suitable data structure (e.g., look-up table) and accessed for a given input. In some embodiments, a reference cranking speed may be accessed by supplying an oil viscosity as input. Alternatively or additionally, the input may comprise an oil temperature, measured or inferred in the manners described above.

Next, at 416 of the method, the engine is cranked with a starter motor (e.g., motor 41 in FIG. 2), which may occur during a start mode of the engine.

Next, at 418 of the method, the current cranking speed during engine cranking is determined via the methods described above (e.g., by measuring PIP signals generated by sensor 118 in FIG. 2). As described above with reference to method 300 of FIG. 3, approaches may be taken to remove transient variations in cranking speed during the measurement period.

Next, at 420 of the method, the difference between the current cranking speed and the reference cranking speed is determined. As described above with reference to method 300 of FIG. 3, this difference may be used to infer oil viscosity. For example, if the current cranking speed is significantly less than the reference cranking speed, it may be concluded that oil viscosity has increased relative to the preceding viscosity.

Next, at 422 of the method, the SOC of a battery (e.g., battery 45 in FIG. 2) operatively coupled to the starter motor may optionally be determined. This battery SOC may then be used to further infer oil viscosity. For example, a change in oil viscosity may be partially attributed to a relatively low battery SOC. Determined battery SOCs may be added to data structures in which cranking speeds are stored. For example, a look-up table may store cranking speeds and one or more associated parameters including but not limited to oil viscosity, oil temperature, and battery SOC.

Next, at 424 of the method, one or more operating parameters are corrected based on the oil viscosity inferred at 412. Among other adjustments, such correction may include adjusting, at 426, the throttle position of a throttle plate controlling an amount of air inducted into the engine—e.g., throttle plate 22 of throttle 21 in FIG. 2. For example, the throttle position of the throttle plate may be increased to further open the throttle upon determining that oil viscosity has increased.

It will be appreciated that method 400 may be modified in various ways. In some embodiments, location-dependent temperature variations throughout the engine may be account for. While engine temperatures are typically measured proximate to intake air, engine coolant, and the cylinder head, engine friction is affected by local temperatures in the bearings, valvetrain, oil pump, and piston/liner surfaces. These local temperatures may be inferred based on one or more of measured temperatures (e.g., based on ECT readings from sensor 112 in FIG. 2), time since starting the engine, known thermal properties of such engine components, and thermal distribution models.

Turning now to FIG. 5, a flowchart illustrating an exemplary method 500 for inferring oil viscosity in a hybrid vehicle is shown. Method 500 may be stored as machine-readable instructions in ROM 106 of controller 12 in FIG. 2, for example. Although method 500 is described with reference to engine 10 of FIG. 2, it will be understood that method 500 may be carried out for other internal combustion engines.

At 502 of method 500, it is determined whether the engine has been inactive for at least a threshold duration, for example by monitoring rotation via PIP signals generated by a Hall effect or other type of sensor as described above with reference to method 300 of FIG. 3. If it is determined that the engine has not remained inactive for at least the threshold duration (NO), the method proceeds to 504. If it is determined that the engine has remained inactive for at least the threshold duration (YES), the method proceeds to 510.

At 504 of the method, oil temperature is determined. As described above with reference to FIG. 4, determination of the oil temperature may include directly measuring the oil temperature at 504 should output from a sensor configured to measure oil temperature be available. Such a sensor may be disposed along the plurality of drain lines 164 or sump 160 in FIG. 2, for example. Conversely, the oil temperature may be inferred at 508 based on a plurality of parameters including the temperature of the engine at the immediately preceding shutdown, the soak time of the engine since shutdown, and the current ambient temperature, which may be determined as described above.

At 510 of the method, if the engine has been remained inactive for at least the threshold duration, the oil temperature is inferred as being the ambient temperature.

Next, at 512 of the method, oil viscosity is inferred. Inferring the oil viscosity includes retrieving a reference cranking power at 514. As the cranking speed is typically set at a desired value for hybrid vehicles with large, high-voltage batteries, oil viscosity may be inferred based on the power supplied to a starter motor (e.g., motor 41 in FIG. 2) facilitating engine cranking. As with reference cranking speeds described above, one or more reference cranking powers may be stored in a suitable data structure (e.g., look-up table) and accessed for a given input. In some embodiments, a reference cranking power may be accessed by supplying an oil viscosity as input. Alternatively or additionally, the input may comprise an oil temperature, measured or inferred in the manners described above.

Next, at 516 of the method, the engine is cranked with a starter motor (e.g., motor 41 in FIG. 2), which may occur during a start mode of the engine.

Next, at 518 of the method, the current cranking power is determined. Various approaches may be employed to remove transient variations in measurements of the cranking power, such as averaging the measured cranking power over at least a portion of the cranking period. The cranking power may be measured electrical power (e.g. electrical current and torque), measured torque and speed, or inferred from other parameters.

Next, at 520 of the method, the difference between the current cranking power and the reference cranking power is determined. This difference may be used to infer oil viscosity. For example, if the current cranking power is significantly higher than the reference cranking power, it may be concluded that oil viscosity has increased relative to the preceding viscosity as a higher cranking power is drawn to achieve engine cranking.

Next, at 522 of the method, the SOC of a battery (e.g., battery 45 in FIG. 2) operatively coupled to the starter motor may optionally be determined. This battery SOC may then be used to further infer oil viscosity. For example, a change in oil viscosity may be partially attributed to a relatively low battery SOC. Determined battery SOCs may be added to data structures in which cranking powers are stored. For example, a look-up table may store cranking powers and one or more associated parameters including but not limited to oil viscosity, oil temperature, and battery SOC.

Next, at 524 of the method, one or more operating parameters are corrected based on the oil viscosity inferred at 512. Among other adjustments, such correction may include adjusting, at 526, the throttle position of a throttle plate controlling an amount of air inducted into the engine—e.g., throttle plate 22 of throttle 21 in FIG. 2. For example, the throttle position of the throttle plate may be increased to further open the throttle upon determining that oil viscosity has increased.

FIG. 6 shows a flowchart illustrating an exemplary method 600 for inferring oil viscosity index is shown. Method 600 may be stored as machine-readable instructions in ROM 106 of controller 12 in FIG. 2, for example. Although method 600 is described with reference to engine 10 of FIG. 2, it will be understood that method 600 may be carried out for other internal combustion engines.

At 602 of method 600, it is determined whether oil viscosities derived from two or more cranking events spanning a temperature range greater than a threshold temperature range are available. In other words, the temperatures to which the derived oil viscosities correspond are different from each other by a threshold amount. As a graph of oil viscosity and temperature may be subsequently determined, the accuracy and utility of this graph may be increased by utilizing data from at least two or more cranking events which span a relatively large range of temperatures (e.g., a span of at least 20° C.). If it is determined that oil viscosities derived from two or more cranking events spanning a temperature range greater than a threshold temperature range are available (YES), the method proceeds to 604. If it is determined that oil viscosities derived from two or more cranking events spanning a temperature range greater than a threshold temperature range are not available (NO), the method ends.

Next, at 604 of the method, an oil viscosity versus temperature graph is determined. The graph may be formed in various suitable manners. For example, the graph may plot oil viscosities versus temperature or may alternatively plot kinematic viscosities versus temperature. The scale on which viscosities and temperatures are shown may be varied as well. For example, viscosities may be plotted on a logarithmic scale. The oil viscosity-temperature graph may be stored in various suitable data structures (e.g., look-up table) in a storage medium such as ROM 106 of controller 12 in FIG. 2.

FIG. 7 shows an example of an oil viscosity-temperature graph 700 formed in accordance with an embodiment of the present disclosure. Here, a plurality of oil viscosities have been inferred based on the methods disclosed herein for a range of temperatures (e.g., oil temperatures) substantially spanning a range extending between −20° C. and 100° C. Particularly, a plurality of kinematic viscosities (in units of $mm^2/s$) are plotted on a logarithmic scale. It will be appreciated that oil viscosity-temperature graph 700 is provided merely as an illustrative example and is not intended to be limiting in any way. Discrete inferred oil viscosities are shown as forming a continuous graph merely for the sake of illustration.

Returning to FIG. 6, at 606 of method 600, a fit is applied to the oil viscosity-temperature graph. This fit may model extrapolated data such that oil viscosities may be inferred for temperatures at which oil viscosities were not learned. The fit may be determined via various known methods and in some examples may be a curve fit (e.g., non-linear). For example, the fit may be determined based on a least-squares method.

Next, at 608 of the method, it is determined whether the most recently determined oil viscosity deviates from the fit determined at 606 by an amount greater than a threshold deviation (e.g., threshold viscosity). The threshold deviation may be set such that transient variations in oil viscosity measurements do not reduce the predictive power of the fit. If it is determined that the most recently determined oil viscosity does not deviate from the fit by an amount greater than the threshold deviation (NO), the method proceeds to 610. If it is determined that the most recently determined oil viscosity does deviate from the fit by an amount greater than the threshold deviation (YES), the method proceeds to 612.

At 610 of the method, the most recently determined oil viscosity is added to the oil viscosity-temperature graph (e.g., graph 700 of FIG. 7).

Next, at 612 of the method, the viscosity index of the oil is inferred based on the fit determined at 606 and applied to the oil viscosity-temperature graph. The viscosity index may be inferred, for example, via the following relation: $V=100((A-B)/(A-C))$, where V is the viscosity index, B is the kinematic viscosity at 40° C., and A and C are values based on the kinematic viscosity at 100° C. The inferred viscosity index may be stored in a storage medium such as ROM 106 of controller 12 in FIG. 2, for example.

Next, at 614 of the method, one or more operating parameters may optionally be corrected based on the oil viscosity index inferred at 612. Among other adjustments, such correction may include adjusting, at 616, the throttle position of a throttle plate controlling an amount of air inducted into the engine—e.g., throttle plate 22 of throttle 21 in FIG. 2. For example, the throttle position of the throttle plate may be increased to further open the throttle upon determining that oil viscosity has increased.

Method 600 facilitates inferring oil viscosity index, and, via determination of a fit to an oil viscosity-temperature graph, determination of oil viscosity for temperatures at which oil viscosity was not inferred, during engine operation and not merely engine cranking.

It will be appreciated that method 600 may be modified in various ways. For example, the placement of decision box 608 may be altered. In some embodiments, the actions carried out via decision box 608, and 610, may be performed in a separate method implemented to add appropriate data points to the oil viscosity-temperature graph.

Turning now to FIG. 8, a flowchart illustrating a method 800 for inferring oil viscosity in an internal combustion engine based on sump refill time is shown. Method 800 may be stored as machine-readable instructions in ROM 106 of controller 12 in FIG. 2, for example. Although method 800 is described with reference to engine 10 of FIG. 2, it will be understood that method 800 may be carried out for other internal combustion engines.

At 802 of method 800, it is determined whether an engine shut down (e.g., deactivation) has occurred. If it is determined that an engine shut down has not occurred (NO), the method ends, as oil viscosity inferences in this embodiment are based on periods in which oil is draining from the engine. If the engine has shut down (YES), the method proceeds to 804.

At 804 of method 800, the temperature of oil in the engine is determined. As described above, oil temperature may be measured directly at 806 if output from a sensor configured to measure oil temperature is available. Alternatively, oil temperature is inferred at 808 based on a plurality of parameters which may include ambient temperature of the engine at the immediately preceding start-up, the amount of time the engine has been running, and the current coolant temperature. Oil temperature may further be inferred based on other temperature readings such as temperature measurements of metal components in the engine. Thus, oil temperature may be inferred from one or more temperatures at various locations within the engine and from one or more engine operating conditions.

Next, at 810 of the method it is determined whether information about a new oil viscosity has been supplied to a control system of the engine, for example by a vehicle operator or service technician. A new oil viscosity may be supplied to an engine controller executing method 800 such as controller 12 of FIG. 2, and stored in a storage medium of the engine controller (e.g., ROM 106). In some scenarios, a new oil viscosity may be supplied in a manufacturing environment prior to, or concurrent with, an initial activation (e.g., firing) of the engine. The engine may be filled with oil. In other scenarios, a new oil viscosity may be supplied upon an oil change. Replacement (or new) oils may have a manufacturer recommended viscosity suited for the engine, or may have other known viscosities. As described above, new oil viscosities may be supplied to an engine control unit in various suitable manners—for example, through a service tool connected to an on-board diagnostics (OBD) port, via an in-vehicle touchscreen or other driver information display, or via a specified sequence or combination of key on/off events and/or switches. If a new oil viscosity has been supplied (YES), the method proceeds to 812. If a new oil viscosity has not been supplied (NO), the method proceeds to 814.

At 812 of the method, the duration of time in which an oil sump is refilled with oil draining from the engine following shut down is learned. Sump refill time may be learned for scenarios in which the engine is new and/or uses oil having a manufacturer recommended viscosity, among others. In these cases, learned sump refill times may be considered to be normal. Oil level sensor 166 in FIG. 2 may be used to indicate the amount of oil in oil sump 160, for example. Measurements from this sensor may then be tracked over time to assess changes in oil levels in the sump (e.g., oil supply to the engine, oil draining from the engine) and determine a sump refill time for a given oil viscosity, which, in this example, is the viscosity supplied to the engine control system. One or more sump refill times may be determined in this way for associated oil viscosities and stored in a suitable storage medium. For example, a plurality of sump refill times and associated oil viscosities may be stored in ROM 106 of controller 12 in FIG. 2, for example, and retrieved via a look-up table. Following 812, the method proceeds to 822.

If it was determined that a new oil viscosity has not been supplied at 810 (NO), the method proceeds to 814 where the viscosity of oil in the engine is inferred. Inferring the oil viscosity includes, at 816, determining the current sump refill time. The current sump refill time may be determined by tracking output from an oil level sensor, as described above. The beginning and end of a sump refill time may be defined in various manners. For example, a sump refill time may extend from the time of engine shut down to a time at which the rate of change of sump oil level decreases below a threshold level. Additionally or alternatively, a sump refill time may be based in part on the oil level sensor indicating when drained oil from the engine reaches a predetermined level in the sump.

Inferring the oil viscosity further includes, at 818, retrieving a stored sump refill time and its associated oil viscosity. As described above, a plurality of sump refill times learned for respective oil viscosities may be stored in a machine-readable storage medium and accessible by the engine control unit (e.g., stored in ROM 106 of controller 12 in FIG. 2).

Inferring the oil viscosity further includes, at 820, determining the difference between the current sump refill time determined at 816 and the stored sump refill time retrieved at 818. This difference may be used to infer oil viscosity. For example, if the current sump refill time is greater than the stored refill time, it may be inferred that the viscosity of oil currently circulating throughout the engine and oil sump is greater than the viscosity of oil for which the stored sump refill time was learned. In some approaches, the difference between the current sump refill time and the stored sump refill time may be multiplied by the viscosity associated with the stored sump refill time to infer the current oil viscosity.

Finally, at 822 of the method, one or more operating parameters may optionally be corrected based on the supplied or inferred oil viscosity. Among other adjustments, such correction may include adjusting, at 824, the throttle position of a throttle plate controlling an amount of air inducted into the engine—e.g., throttle plate 22 of throttle 21 in FIG. 2. For example, the throttle position of the throttle plate may be increased to further open the throttle upon determining that oil viscosity has increased. In some embodiments, correction of one or more operating parameters may be performed based on other quantities such as determined oil temperature.

It will be appreciated that method 800 may be modified in various suitable manners. For example, sump refill times may be learned for scenarios in which a new oil viscosity is not supplied. In some approaches, learning may be periodically scheduled such that sump refill times are learned as the engine and other components gradually age.

Turning now to FIG. 9, a flowchart illustrating a method 900 for inferring oil viscosity index is shown. Method 900 may be stored as machine-readable instructions in ROM 106 of controller 12 in FIG. 2, for example. Although method 900 is described with reference to engine 10 of FIG. 2, it will be understood that method 900 may be carried out for other internal combustion engines.

At 902 of method 900, it is determined whether oil viscosities inferred two or more times since the last oil change and spanning a temperature range greater than a threshold temperature range are available. As a graph of oil viscosity and temperature may be subsequently determined, the accuracy and utility of this graph may be increased by utilizing data from at least two or viscosity inferences which span a relatively large range of temperatures (e.g., a span of at least 20° C.). If it is determined that oil viscosities inferred two or more times since the last oil change and spanning a temperature range greater than a threshold temperature range are available (YES), the method proceeds to 904. If it is determined that oil viscosities inferred two or more times since the last oil change and spanning a temperature range greater than a threshold temperature range are not available (NO), the method ends.

Next, at 904 of the method, an oil viscosity versus temperature graph is determined. The graph may be formed in various suitable manners. For example, the graph may plot oil viscosities versus temperature or may alternatively plot kinematic viscosities versus temperature. The scale on which viscosities and temperatures are shown may be varied as well. For example, viscosities may be plotted on a logarithmic scale. The oil viscosity-temperature graph may be stored in various suitable data structures (e.g., look-up table) in a storage medium such as ROM 106 of controller 12 in FIG. 2.

Next, at 906 of the method, a fit is applied to the oil viscosity-temperature graph. This fit may model extrapolated data such that oil viscosities may be inferred for temperatures at which oil viscosities were not inferred. The fit may be determined via various known methods and in some examples may be a curve fit (e.g., non-linear). For example, the fit may be determined based on a least-squares method.

Next, at 908 of the method, it is determined whether the most recently determined oil viscosity deviates from the fit determined at 906 by an amount greater than a threshold deviation (e.g., threshold viscosity). The threshold deviation may be set such that transient variations in oil viscosity measurements do not reduce the predictive power of the fit. In some embodiments, two or more viscosities spanning a minimum duration may be evaluated against the threshold deviation. If it is determined that the most recently determined oil viscosity does not deviate from the fit by an amount greater than the threshold deviation (NO), the method proceeds to 912. If it is determined that the most recently determined oil viscosity does deviate from the fit by an amount greater than the threshold deviation (YES), the method proceeds to 910.

At 910 of the method, it is inferred that an oil change has occurred. Upon making this inference, a plurality of actions not shown may be carried out. For example, an oil viscosity learning event may be preferentially scheduled. Alternatively or additionally, a vehicle operator may be informed of the oil change via dashboard indicators, a display panel, etc.

At 912 of the method, the viscosity index of the oil is inferred based on the fit determined at 906 and applied to the oil viscosity-temperature graph. The viscosity index may be inferred, for example, via the following relation: $V=100((A-B)/(A-C))$, where V is the viscosity index, B is the kinematic viscosity at 40° C., and A and C are values based on the kinematic viscosity at 100° C. The inferred viscosity index may be stored in a storage medium such as ROM 106 of controller 12 in FIG. 2, for example.

Next, at 914 of the method, one or more operating parameters may optionally be corrected based on the oil viscosity index inferred at 912. Among other adjustments, such correction may include adjusting, at 916, the throttle position of a throttle plate controlling an amount of air inducted into the engine as described above. In some embodiments, correction of one or more operating parameters may be performed based on other quantities such as determined oil temperature.

In some scenarios, the current oil viscosity and viscosity index may be unknown. Therefore, an assumed oil viscosity and/or viscosity index may be used during engine operation. As one non-limiting example, the idle speed of the engine (e.g., engine 10) may be controlled by determining an initial throttle position for a throttle controlling the amount of air inducted into the engine based on a desired idle speed and an assumed oil viscosity. The assumed oil viscosity may be based on the previously determined or supplied oil viscosity. Subsequently, upon learning the current viscosity index via the methods described above, the initial throttle position may be corrected based on the learned viscosity index in addition to other parameters such as the present oil temperature. Routines employed in controlling throttle position may further increase the throttle position when the actual idle speed is less than the desired idle speed, and decrease the throttle position when the actual idle speed is greater than the desired idle speed.

Turning now to FIG. 10, flowchart illustrating a method 1000 for controlling the idle speed of an internal combustion engine is shown. Method 1000 may be employed to control the idle speed of engine 10 in FIG. 2, for example, though it will be understood that method 1000 may be used to control the idle speed of other engines. Method 1000 may be stored as machine-readable instructions in ROM 106 of controller 12 in FIG. 2, for example.

At 1002 of method 1000, a throttle angle is determined for a desired engine idle speed assuming a standard viscosity of engine oil. The throttle angle may be determined for an intake throttle configured to control the amount of air inducted into the engine—for example, throttle 21 in FIG. 2. Determining a throttle angle may include accessing a data base in which a plurality of throttle angles are stored and associated with desired engine idle speeds. For example, a throttle angle may be retrieved by supplying a desired engine idle speed to a look-up table. The standard viscosity of engine oil which is assumed may correspond to a manufacturer recommended oil viscosity for the engine, or may be based on one or more previously determined oil viscosities and other factors such as the time since the most recently determined oil viscosity.

Next, at 1004 of the method, the actual viscosity of engine oil is calculated based on the current oil temperature and viscosity index. As described above, measurement of oil temperature may be carried out directly or inferred based on other readings such as ECT readings from sensor 112 in FIG. 2, for example. Viscosity index may be inferred via method 900 shown in FIG. 9.

Next, at 1006 of the method, the throttle angle determined at 1002 is increased if the actual viscosity calculated at 1004 is greater than the assumed standard viscosity. Alternatively, if the actual viscosity is less than the assumed standard viscosity, the throttle angle is decreased. In some embodiments, the throttle angle may be increased or decreased in proportion to the difference between the calculated and assumed standard viscosity.

Next, at 1008 of the method, it is determined whether the actual idle speed is greater than the desired idle speed. Actual idle speed may be determined by monitoring PIP signals generated by sensor 118 in FIG. 2, for example. If it is determined that the actual idle speed is greater than the desired idle speed (YES), the method proceeds to 1010. If it is determined that the actual idle speed is not greater than the desired idle speed (NO), the method proceeds to 1012.

At 1010 of the method, the throttle angle is decreased in order to reduce the difference between the actual idle speed and desired idle speed. In some embodiments, the throttle angle may be decreased in proportion to the difference between the actual idle speed and the desired idle speed. Following 1010, the method ends.

At 1012 of the method, it is determined whether the actual idle speed is less than the desired idle speed. If it is determined that the actual idle speed is less than the desired idle speed (YES), the method proceeds to 1014. If it is determined that the actual idle speed is not less than the desired idle speed (NO), the method ends.

Finally, at 1014 of the method, the throttle angle is increased in order to reduce the difference between the actual idle speed and the desired idle speed. In some embodiments, the throttle angle may be increased in proportion to the difference between the actual idle speed and the desired idle speed. Following 1014, the method ends.

FIG. 11 shows a flowchart illustrating a method 1100 for inferring oil viscosity in a modular hybrid transmission (MHT) hybrid. Method 1100 may be implemented in the hybrid vehicle schematically shown in FIG. 1, for example, which includes disconnect clutch 7 and driveline integrated starter/generator (DISG) 3.

At 1102 of the method, it is determined whether an engine restart at a temperature above a threshold temperature has occurred. The temperature of engine 10 in FIG. 1 may be determined in various suitable manners—for example, via ECT readings from sensor 112 in FIG. 2. In some embodiments, the threshold temperature may be selected such that the method proceeds for hot restarts but not for restarts at cooler temperatures. In other embodiments, the threshold temperature may be relatively lower such that the method proceeds for warm restarts as well. Generally, the threshold temperature may be selected such that inferences of the oil viscosity are performed for instances in which the engine is cranked via a DISG and not a typical starter motor. If an engine restart has occurred at a temperature above the threshold temperature (YES), the method proceeds to 1104. If an engine restart has not occurred at a temperature above the threshold temperature (NO), the method ends.

Next, at 1104 of the method, it is determined whether torque is being delivered by the disconnect clutch, driven by the DISG, to one or more wheels of the vehicle. This determination may be accomplished by monitoring torque output from the disconnect clutch and/or DISG, and alternatively or additionally monitoring or inferring wheel rotation. In one example, torque output from the disconnect clutch may be determined based on output from sensor 8 in FIG. 1 and output from sensor 118 in FIG. 2. Differential positions across sensor 8, provided via its output, and engine crank positions indicated by sensor 118 may be used to calculate the torque across a rotary spring of dual mass flywheel 5 in FIG. 1, which may then be equated to the disconnect clutch torque during engine restart. If it is determined that torque is not being delivered to any wheels in the vehicle (NO), and that the DISG is exclusively providing torque to crank the engine, the method proceeds to 1106. If it is determined that torque is being delivered to one or more wheels in the vehicle (YES), the method proceeds to 1108.

At 1106 of the method, the disconnect clutch torque is determined based on the DISG torque. As the DISG is exclusively providing torque to crank the engine, the disconnect clutch torque is equated to the DISG torque.

At 1108 of the method, having determined that torque was being delivered to one or more wheels of the vehicle, it is determined whether the disconnect clutch is slipping. If it is determined that the disconnect clutch is not slipping (NO), the method ends. If it is determined that the disconnect clutch is slipping (YES), the method proceeds to 1109 where it is determined whether the engine speed gradient is constant (e.g., vehicle acceleration is zero or a constant value). If the engine speed gradient is not constant (NO), the method proceeds to 1110 where the disconnect clutch torque is estimated. Estimating the disconnect clutch at 1110 includes, at 1112 determining the clutch pressure, and at 1114 determining the slip speed of the disconnect clutch, as the magnitude of torque transmitted by the slipping clutch may be calculated as the clutch pressure multiplied the effective clutch area, and the sign of clutch torque may be determined based on the sign of the clutch slip speed. In some examples, the clutch pressure may be a known quantity and thus can be directly determined. In other examples, the clutch pressure is inferred from the commanded clutch pressure. Clutch slip speed and sign may be determined based on output from sensor 8 in FIG. 1, described above.

If it is determined at 1109 that the engine speed gradient is constant (YES), the method proceeds to 1116 where the disconnect clutch is estimated based on the change in DISG torque.

Following 1106, 1110, and 1116, the viscosity of oil flowing through the vehicle and engine is determined. At this region of the method, oil viscosity may be determined in a manner similar to those described above. Specifically, a reference disconnect clutch torque is retrieved at 1120. One or more reference disconnect clutch torques may be stored in a suitable data structure (e.g., look-up table) and accessed for a given input. In some embodiments, a reference disconnect clutch torque may be accessed by supplying an oil temperature as the input, measured or inferred in the manners described above. At 1122, the difference between this reference disconnect clutch torque and the current disconnect clutch torque is determined. This difference may be used to infer oil viscosity. For example, if the current disconnect clutch torque is significantly higher than the reference disconnect clutch torque, it may be concluded that oil viscosity has increased relative to the preceding viscosity as a higher torque is supplied to achieve engine cranking and/or wheel rotation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:
cranking the engine during a start mode with an electric motor connected to a substantially constant source of electrical power;
inferring engine oil viscosity based at least on engine oil temperature and a cranking speed of the engine while being cranked by said electric motor during said start mode compared to a reference cranking speed; and
correcting an operating parameter of the engine based on said inferred engine oil viscosity.

2. The method recited in claim 1 wherein said inferring engine oil viscosity comprises taking a difference between said cranking speed of the engine while being cranked during said start mode and said reference cranking speed, wherein said reference cranking speed is a speed of the engine when cranked with a known oil viscosity.

3. The method recited in claim 2 further comprising learning said reference cranking speed of the engine when the engine is new and filled with oil having said known oil viscosity.

4. The method recited in claim 1 wherein said engine oil temperature is ambient temperature if the engine has been shut off for a predetermined time before initiation of said start mode.

5. The method recited in claim 4 wherein said engine oil temperature is measured or inferred based on engine temperature at shutdown, soak time, and ambient temperature at said initiation of said start mode if the engine was shut off for less than said predetermined time before said initiation of said start mode.

6. The method recited in claim 1 further comprising following an engine restart above a threshold temperature, inferring said engine oil viscosity based on torque supplied by a disconnect clutch, the engine cranked by the disconnect clutch.

7. The method recited in claim 1 wherein said operating parameter of the engine comprises a throttle position of a throttle plate controlling an amount of air inducted into the engine.

8. The method recited in claim 7 wherein said throttle plate is commanded to a throttle position based on a desired engine idle speed, oil temperature and an assumed viscosity of said oil, and said throttle position is corrected for said inferred oil viscosity.

9. A method for controlling an engine, comprising:
cranking the engine during a start mode with an electric motor connected to a substantially constant source of electrical power;
inferring engine oil viscosity based at least on engine oil temperature and speed of the engine while being cranked by said electric motor during said start mode;
after at least two of said inferences, learning a viscosity index of said engine oil via performing a curve fit on a graph of said inferred engine oil viscosities and said temperatures;
after performing said curve fit, if a most recently determined engine oil viscosity does not deviate from said curve fit by more than a threshold deviation, inferring the viscosity index of the most recently determined engine oil based on the curve fit; and
correcting an engine operating parameter based on a current temperature of said engine oil and said learned viscosity index of said engine oil.

10. The method recited in claim 9 wherein said engine oil temperatures used during said viscosity index learning are different from each other by a threshold amount.

11. The method recited in claim 10 wherein said curve fit is determined based on a least-squares method.

12. The method recited in claim 9 further comprising, if the most recently determined engine oil viscosity does not deviate from said curve fit by more than the threshold deviation, adding the most recently determined engine oil viscosity to the graph.

13. The method recited in claim 9 further comprising a determination that an engine oil change has occurred when one of said inferred engine oil viscosities deviates from said curve fit by more than the threshold deviation.

14. A method for controlling an engine, comprising:
accelerating the engine during a start mode with an electric motor until the engine reaches a predetermined speed;
inferring engine oil viscosity based at least on engine oil temperature and an amount of electrical power used by the electric motor for the engine to reach said predetermined speed during said start mode; and
correcting an operating parameter of the engine based on said inferred oil viscosity.

15. The method recited in claim 14 wherein said electric motor and the engine propel a hybrid vehicle, and wherein said electrical power is provided to the electric motor via a battery.

16. The method recited in claim 14 wherein said correcting the operating parameter of the engine is further based on engine oil temperature during said correction.

17. The method recited in claim 14 wherein said engine oil temperature is ambient temperature if the engine has been shut off for a predetermined time before initiation of said start mode.

18. The method recited in claim 17 wherein said engine oil temperature is measured or inferred based on engine temperature at shutdown, soak time, and ambient temperature at said initiation of said start mode if the engine was shut off for less than said predetermined time before said initiation of said start mode.

19. The method recited in claim 14 wherein said operating parameter of the engine comprises a throttle position of a throttle plate controlling an amount of air inducted into the engine.

20. The method recited in claim 19 wherein said throttle plate is commanded to a throttle position based on a desired engine idle speed, oil temperature and an assumed viscosity of said oil, and said throttle position is corrected for said inferred oil viscosity.

\* \* \* \* \*